US008783144B2

(12) United States Patent
Compagnone et al.

(10) Patent No.: US 8,783,144 B2
(45) Date of Patent: Jul. 22, 2014

(54) WASTE STRIPPING UNIT WITH SIMPLIFIED TOOL CHANGE FOR A PACKAGING PRODUCTION MACHINE

(75) Inventors: Giovanni Compagnone, Crissier (CH); Glenn Corminboeuf, Belfaux (CH)

(73) Assignee: Bobst Mex SA (CH)

(*) Notice: Subject to any disclaimer, the term of this patent is extended or adjusted under 35 U.S.C. 154(b) by 293 days.

(21) Appl. No.: 13/318,643

(22) PCT Filed: May 12, 2010

(86) PCT No.: PCT/EP2010/002922
§ 371 (c)(1), (2), (4) Date: Nov. 3, 2011

(87) PCT Pub. No.: WO2010/130429
PCT Pub. Date: Nov. 18, 2010

(65) Prior Publication Data

US 2012/0055301 A1 Mar. 8, 2012

(30) Foreign Application Priority Data

May 13, 2009 (EP) .................................... 09006437

(51) Int. Cl.
*B23D 25/12* (2006.01)
*B26D 7/06* (2006.01)
*B26D 7/20* (2006.01)

(52) U.S. Cl.
USPC ............................. 83/100; 83/347; 83/698.42

(58) Field of Classification Search
USPC ..................... 83/78, 100, 102, 111, 112, 122, 83/151–152, 156, 161, 302, 337, 347, 83/698.42, 659; 442/1.269, 367–368; 101/227–228; 492/48
See application file for complete search history.

(56) References Cited

U.S. PATENT DOCUMENTS

| | | | | | |
|---|---|---|---|---|---|
| 1,832,481 | A | * | 11/1931 | Gebhart | 493/60 |
| 2,161,502 | A | * | 6/1939 | Brown | 19/33 |
| 2,792,060 | A | | 5/1957 | Bruns | |
| 2,899,871 | A | | 8/1959 | Auer | |
| 2,933,772 | A | * | 4/1960 | Hattori et al. | 19/108 |
| 3,320,864 | A | * | 5/1967 | Zernov | 493/373 |

(Continued)

FOREIGN PATENT DOCUMENTS

| | | | |
|---|---|---|---|
| EP | 0947717 | A | 10/1999 |
| EP | 1057596 | | 12/2000 |
| WO | WO 93/13917 | A | 7/1993 |
| WO | WO 2006/116954 | A | 11/2006 |

OTHER PUBLICATIONS

International Search Report dated Sep. 1, 2010, issued in corresponding international application No. PCT/EP2010/002922.

*Primary Examiner* — Ghassem Alie
*Assistant Examiner* — Bharat C Patel
(74) *Attorney, Agent, or Firm* — Ostrolenk Faber LLP

(57) ABSTRACT

A waste stripping unit in a packaging production machine (1), positioned downstream of a cutting unit (3) for cutting one or more flat substrates (4). The stripping unit includes a frame (16) supporting two rotary tools cooperating with one another (17, 18). At least one of the two tools (17, 18) is formed with a mandrel (27) and a removable sleeve (28), and the sleeve can be inserted on, fixed to and driven in rotation by the mandrel (27). One tool has protruding needles for the stripping and the other tool has a flexible strip cooperating with the needles.

14 Claims, 3 Drawing Sheets

(56) References Cited

U.S. PATENT DOCUMENTS

| | | | | |
|---|---|---|---|---|
| 3,404,607 | A * | 10/1968 | Feick et al. | 493/373 |
| 3,643,553 | A * | 2/1972 | Morimoto | 493/373 |
| 3,877,353 | A * | 4/1975 | Smith et al. | 493/373 |
| 4,119,032 | A * | 10/1978 | Hollis | 101/216 |
| 4,158,128 | A * | 6/1979 | Evdokimov et al. | 219/469 |
| 4,158,429 | A * | 6/1979 | Ohmori | 226/34 |
| 4,530,693 | A * | 7/1985 | Isowa | 493/342 |
| 4,613,321 | A * | 9/1986 | Kesten et al. | 493/342 |
| 4,715,847 | A * | 12/1987 | Focke et al. | 493/11 |
| 4,985,012 | A * | 1/1991 | Marschke | 493/373 |
| 4,989,487 | A * | 2/1991 | Staley | 83/506 |
| 5,087,237 | A * | 2/1992 | Nunley | 493/342 |
| 5,233,813 | A * | 8/1993 | Kenney et al. | 53/450 |
| 5,300,009 | A * | 4/1994 | Bittenbender | 493/373 |
| 5,507,226 | A * | 4/1996 | Burke et al. | 101/228 |
| 5,622,111 | A * | 4/1997 | Bachmeir et al. | 101/415.1 |
| 5,802,975 | A * | 9/1998 | Prem et al. | 101/375 |
| 6,125,752 | A * | 10/2000 | Freddo et al. | 101/182 |
| 6,397,714 | B1 | 6/2002 | Borel | |
| 6,925,918 | B1 * | 8/2005 | Bunge | 83/116 |
| 6,926,653 | B2 * | 8/2005 | Georgiades | 493/82 |
| 7,111,534 | B1 * | 9/2006 | Simpson | 83/27 |
| 7,827,891 | B1 * | 11/2010 | Grafe et al. | 83/343 |
| 2004/0053761 | A1 | 3/2004 | Georgiades | |
| 2005/0019078 | A1 * | 1/2005 | Meier et al. | 400/76 |
| 2005/0111889 | A1 * | 5/2005 | Cormier et al. | 399/302 |
| 2005/0163527 | A1 * | 7/2005 | Tombs | 399/98 |
| 2008/0067717 | A1 * | 3/2008 | Lampignano | 264/293 |
| 2008/0115903 | A1 * | 5/2008 | Gelli et al. | 162/357 |
| 2009/0071353 | A1 * | 3/2009 | Esparch Marti et al. | 101/141 |

* cited by examiner

WASTE STRIPPING UNIT WITH SIMPLIFIED TOOL CHANGE FOR A PACKAGING PRODUCTION MACHINE

CROSS-REFERENCE TO RELATED APPLICATIONS

The present application is a 35 U.S.C. §§371 national phase conversion of PCT/EP2010/002922, filed May 12, 2010, which claims priority of European Application No. 09006437.9, filed May 13, 2009, the contents of which are incorporated by reference herein. The PCT International Application was published in the French language.

The present invention relates to a waste stripping unit for waste obtained by cutting a flat substrate. The invention also relates to a waste stripping unit that facilitates any stripping tool change. The invention also relates to a packaging production machine comprising, in order and in succession, a cutting unit and a waste stripping unit.

A packaging production machine is intended for the production of boxes, which will form packaging, after folding and gluing. In this machine, an initial flat substrate, such as a continuous strip of cardboard, is unwound and printed by a print unit, itself consisting of subunits in the form of printing units. The strip is then transferred into a cutting unit.

After cutting, the blanks obtained have areas of waste that are separated and discarded into a waste stripping unit, so as to be able to then create boxes. The blanks are then separated in a separator to obtain individualized boxes.

The unit for stripping of this waste is mounted after the cutting unit. The stripping unit ensures a precise and rapid stripping of wastes. The precision of operation of the stripping unit also makes it possible to avoid having the waste cause jams.

The stripping unit comprises two tools, in the form of two rotary cylinders, positioned parallel to one another, so as to cooperate with one another. The blanks travel between the two cylinders following a substantially horizontal path.

One of the tools or cylinders, the bottom cylinder, has radial needles which are pressed into each waste. The needles separate the wastes from the blank by carrying them away with the rotation of the needle cylinder. These wastes are then removed from these radial needles during the rotation of the cylinders. Ejectors in the form of immobile combs are arranged parallel to the cylinders. The radial needles are thus freed up and will be pressed into other wastes when they next pass into the cutting area of the next blank.

The other tool or cylinder, the top cylinder, has on its surface either strips made of a flexible material, for example foam, arranged in successive rings spaced apart, or a single strip forming a complete covering made of a flexible material, for example of vulcanized rubber type. Holes are pierced in the cylinder outside of the foam strips or in the vulcanization layer, depending on the version. The position of the holes corresponds to that of the needles. These needles are accommodated in the holes as the two cylinders rotate, to ensure that they effectively pierce through the wastes. The top cylinder transports the blanks and holds them when the waste is spiked.

STATE OF THE ART

Prior art documents U.S. Pat. No. 2,899,871 and EP-1,057,596 give examples of cut waste stripping systems.

However, the operations involved in changing stripping cylinders prove to be lengthy and tedious. The users want to be able to make extremely rapid job changes by modifying the stripping cylinders, in order to address the increasingly exacting demands of their customers for printing and cutting in small series.

First of all, the operator mechanically disconnects the needle-holding cylinder to remove it from its drive mechanism. Then, the operator takes the cylinder out of the stripping unit, and out of the machine. Next, the operator precisely introduces the stripping needles one after the other in drill-holes provided in the surface of a new cylinder, according to a pattern representing the blank. Finally, the operator replaces the new cylinder in the stripping unit by reconnecting it to its drive.

The weight of a cylinder is 30 kg to 50 kg, or even up to 900 kg in the case of a bottom cylinder with needles associated with a top cylinder with cutting blades. To take it out, the operator lifts it using a hoist.

Because of the fairly heavy weight, a change of cylinder cannot be performed very quickly. Job changes, and thus tool changes, are necessary to obtain numerous different boxes. The frequent cylinder handling operations thus prove lengthy and tedious.

The cylinder spiked with needles represents an injury danger to the operator. Nevertheless, this cylinder, when ready to use, has to be handled to be replaced in the waste stripping unit.

SUMMARY OF THE INVENTION

A main objective of the present invention is to develop a waste stripping unit positioned downstream of a cutting unit for a packaging production machine. A second objective is to produce a waste stripping unit that allows the stripping tool or tools to be prepared outside the machine. A third objective is to simplify and facilitate any change of one or more stripping tools. Yet a fourth objective is to obtain stripping of the waste that avoids the problems of the state of the art. Yet another objective is to provide a packaging production machine with a waste stripping unit integrated after an upstream cutting unit and that offers a wide flexibility of use.

In a first aspect, the present invention relates to a waste stripping unit in a packaging production machine, which is positioned downstream of a cutting unit for cutting one or more flat substrates. The unit comprises a frame and two rotary tools cooperating with one another. At least one of the two tools is formed with a mandrel and a removable sleeve, which can be inserted and extracted, fixed and driven in rotation by the mandrel.

In other words, with the replacement of a removable sleeve bearing a series of needles or at least one strip of flexible material with another removal sleeve bearing another series of needles or at least one other strip of flexible material, the job change is performed in a very short time. A bottom sleeve with a bottom mandrel form the bottom tool and/or a top sleeve with a top mandrel form the top tool. The two tools are inexpensive and at most require only two sleeves. As an example, the weight of a removable sleeve is less than 18 kg, this weight having to be compared with that of a complete tool.

In a second aspect of the invention, a packaging production machine comprises the waste stripping unit having one or more of the technical characteristics described hereinbelow and claimed, positioned downstream of a cutting unit.

The upstream and downstream directions are defined with reference to the direction of displacement of the substrate, following the longitudinal direction in the waste stripping unit and throughout the packaging production machine. The longitudinal direction is defined with reference to the direction of displacement of the flat substrate in the waste stripping unit and in the machine, along its median longitudinal axis. The transverse direction is defined as being the direction perpendicular to the direction of displacement of the flat substrate. The front and rear positions are defined relative to the transverse direction, as being, respectively, the operator's side and the opposite operator's side.

According to another aspect, the invention relates to a sleeve for a waste stripping unit. The waste stripping unit is positioned downstream of a cutting unit for cutting one or more flat substrates in a packaging production machine. The sleeve is able to be fixed and driven in rotation by a mandrel, so as to form a rotary tool. This rotary tool is able to cooperate with another rotary tool provided with at least one strip made of a flexible material. The sleeve has a wall with an outer surface, provided with waste stripping needles, engaged into the wall and protruding radially outward from the outer surface.

In yet another aspect, the present invention relates to a sleeve for a waste stripping unit, positioned downstream of a cutting unit for cutting one or more flat substrates in a packaging production machine, which is able to be fixed and driven in rotation by a mandrel, so as to form a rotary tool, which is able to cooperate with a rotary tool provided with waste stripping needles, and having a wall with an outer surface, provided with at least one strip made of a flexible material, protruding radially outward from the outer surface.

With the invention, the user needs only a minimum of infrastructures for storing sleeves, adapting the sleeves by drilling and introducing the needles, and thereby manufacturing the tools.

According to yet another aspect of the invention, a waste stripping cassette for a waste stripping unit is positioned downstream of a cutting unit for cutting one or more flat substrates in a packaging production machine. The waste stripping cassette comprises a frame provided with bearings, supporting two rotary tools cooperating with one another. One of the tools is provided with waste stripping needles protruding radially outward. The other of the tools is provided with at least one strip made of a flexible material protruding radially outward. At least one of the two tools is formed with a mandrel and a removable sleeve, which is able to be inserted and removed, fixed and driven in rotation by the mandrel.

With one or two sleeves and the waste stripping cassette, access, mounting and dismounting are facilitated for the operator responsible for setting and maintaining the unit and the machine. With a more ergonomic stripping unit, the risk of error in introducing the needles is greatly reduced, which consequently results in a reduction in the number of blanks or boxes that fail to conform or do not have optimum quality.

BRIEF DESCRIPTION OF THE DRAWINGS

The invention will be better understood and its various advantages and different characteristics will become more apparent from the following description, of the nonlimiting exemplary embodiment, with reference to the appended schematic drawings, in which.

DETAILED EXPLANATION OF PREFERRED EMBODIMENTS

Figure 1:
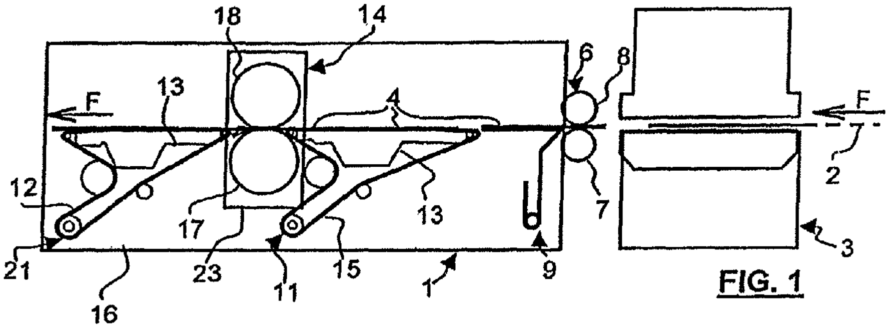
FIG. 1 represents a synoptic side view of a packaging production machine fitted with a waste stripping unit.

As FIG. 1 illustrates, a packaging production machine (1) processes a substrate or a material in a continuous strip (2), which is in this case flat cardboard. The machine (1) comprises a transformation unit, for example a diecutting platen press (3). Upstream of the press (3), the machine (1) may have units such as printing units, means for checking quality and register, embossing units, etc. (not represented).

The strip (2) enters into the press (3) from its upstream transverse side. The press (3) cuts the strip (2) and delivers the substrate in the form of blanks (4), made of flat cardboard. The blanks (4) leave the press (3) by its downstream transverse side. The direction of progress or of advance (arrows F) of the strip (2) and of the blanks (4) in the longitudinal direction indicates the upstream direction and the downstream direction.

The machine (1) comprises a drive arrangement (6), which is arranged downstream of the press (3). This arrangement (6) firstly comprises a bottom drive roller (7), driven in rotation by a motor. The arrangement (6) then comprises one or a series of small pressure rollers (8), arranged above and bearing against the roller (7). The blanks (4) are engaged, held and driven between the roller (7) and the small rollers (8). The arrangement (6) ensures an active transfer of the blanks (4), so as to release the blanks (4), in succession one after the other, from the press (3), in the longitudinal direction (F), from upstream to downstream.

The machine (1) comprises a transfer device (9) for the blanks (4). The device (9) is intended to transfer the blanks (4) in succession one after the other, from the arrangement (6), downstream, in the longitudinal direction (F).

The machine (1) comprises a first transport assembly, which is more specifically a first vacuum transport (11), and which is arranged downstream of the transfer device (9). This first vacuum transport (11) comprises a conveyor with one or more endless belts with orifices (12). A vacuum chamber (13), connected to a vacuum source, presses the blanks (4) against the belt (12).

The blanks (4) are arranged, one after the other, with a short gap between them on the top face of the belt (12). The first vacuum transport (11) ensures an active transfer of the blanks (4). The belt (12) drives the blanks (4), in the longitudinal direction (F), from upstream to downstream.

The machine (1) then comprises a waste stripping unit (14), which is placed downstream of the press (3) and after the first vacuum transport (11). This unit (14) allows for the controlled elimination of the cardboard wastes which are precut from the blanks (4).

The waste stripping unit (14) comprises a supporting structure or a frame (16). Advantageously, the unit (14) may include the first transport assembly, i.e. the first vacuum transport (11), for the blanks (4). The frame (16) is dimensioned so that the transfer device (9) and this first vacuum transport (11) can advantageously be attached therein.

The central part of the unit (14) comprises a first, cylindrical, bottom rotary tool (17), cooperating with a second, cylindrical, top rotary tool (18). The two tools (17 and 18) are attached, parallel to one another, one above the other, and transversally to the frame (16), and thus to the unit (14). The first transport assembly, i.e. the first vacuum transport (11), may be placed upstream of the two rotary tools (17 and 18).

Figure 8:
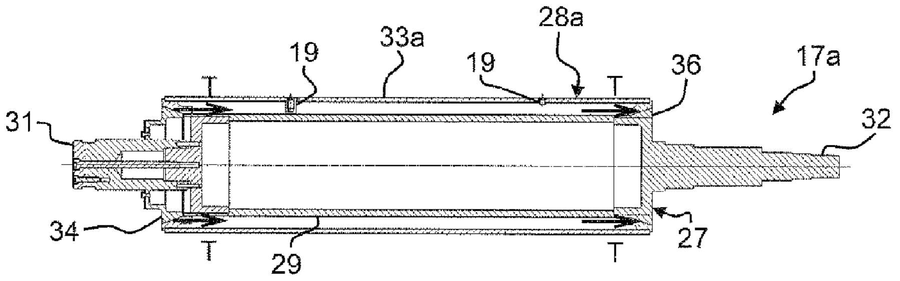
FIGS. 8 and 9 represent a longitudinal cross-sectional view of a waste stripping tool, according to a first embodiment and a second embodiment.
Figure 9:
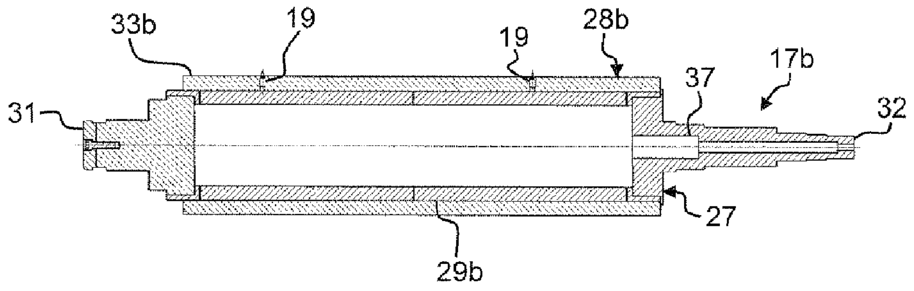

As can be seen in FIGS. 8 and 9, the bottom tool (17) is provided with radial needles (19) which protrude radially toward the top tool (18). These needles (19) are positioned appropriately on the surface of the bottom tool (17) at the places where the cutting of the strip (2) produces wastes. Thus, these needles (19) are spiked into each of the waste areas, so as to be able to eliminate them using combs attached in proximity to the bottom tool (17).

Figure 2:
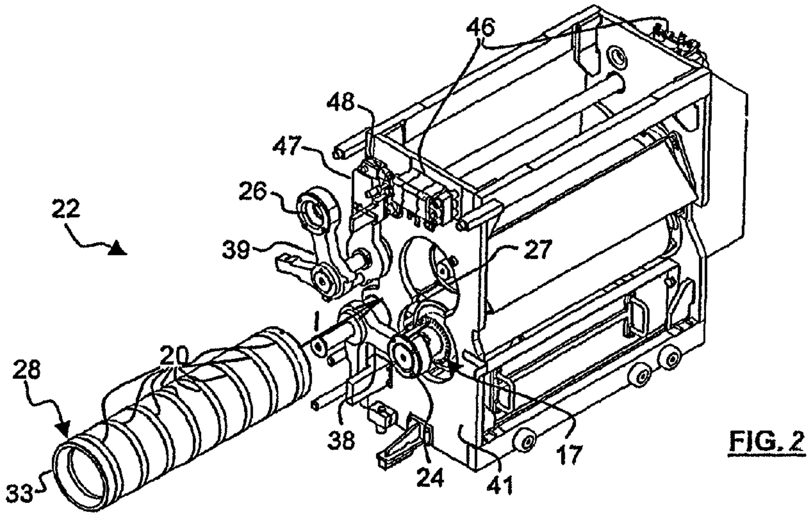
FIG. 2 represents a perspective view of a waste stripping cassette, according to the invention, with a mandrel of one of the two tools in the extracted position.
Figure 3:
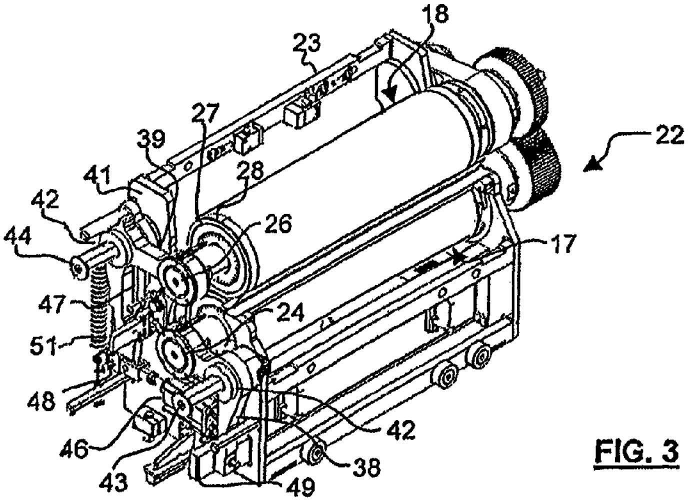
FIG. 3 represents a perspective view of a waste stripping cassette, according to a second alternative embodiment.
Figure 4:
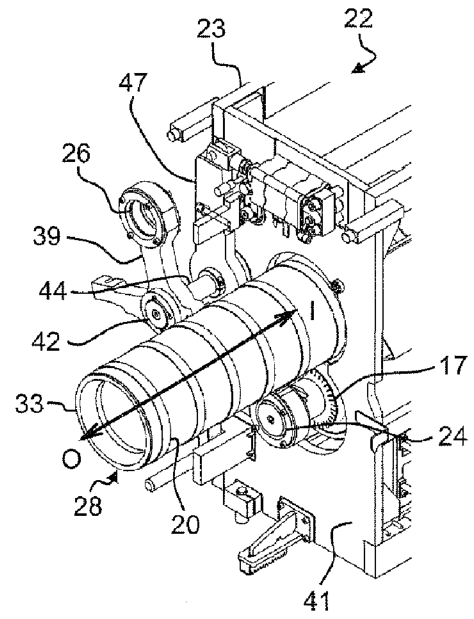
FIGS. 4 to 7 represent partial perspective views of the front of the cassette of FIG. 2, showing the different steps in introducing a sleeve to form the stripping tool.
Figure 5:
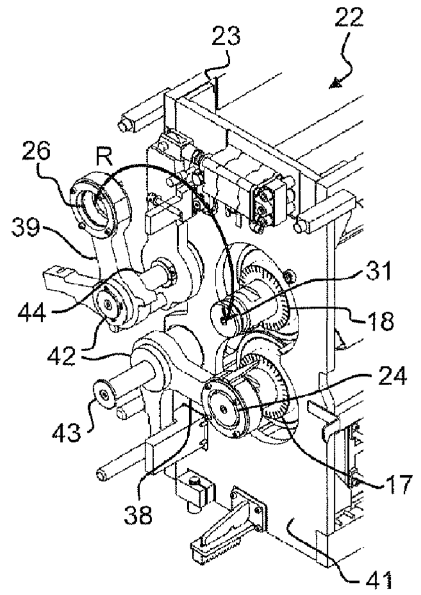
Figure 6:
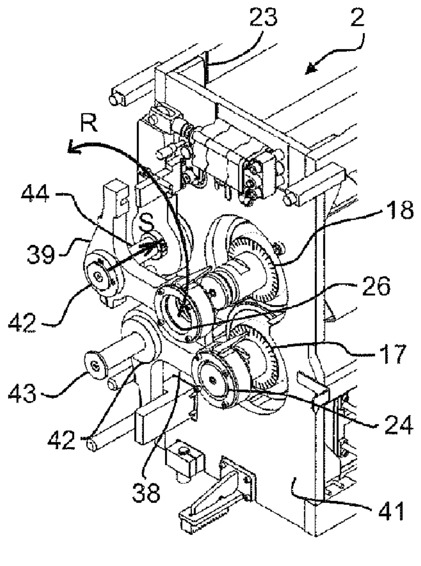
Figure 7:
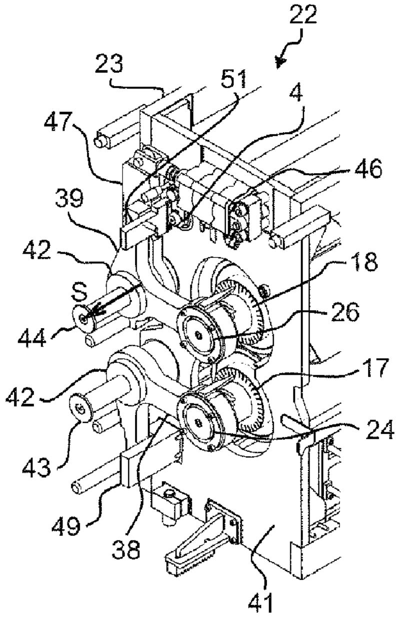

As can be seen in FIGS. 2 and 5, the top tool (18) is provided with a series of foam strips (20) which protrude radially toward the bottom tool (17). These strips (20) are positioned on the surface of the top tool (18) at axial places where there are no corresponding needles (19) for the bottom tool (17).

The machine (1) comprises a second transport assembly, which is, more specifically, a second vacuum transport (21), and which is arranged downstream of the waste stripping unit (14). The second transport assembly (21) is substantially similar to the first transport assembly (11), with endless belts with orifices (12) and a vacuum chamber (13).

The unit (14) may comprise this second transport assembly for the blanks (4), i.e. the second vacuum transport (21). This second vacuum transport (21) may be placed downstream of the two rotary tools (17 and 18). The second transport assembly (21) may be mounted in the frame (16).

The machine (1) then comprises a separator (not represented), which is arranged downstream of the waste stripping unit (14), after the second transport assembly (21). The nicks or weakened areas present on the blanks (4) and between the boxes are broken by the separator, and the blanks (4) are thus transformed into boxes.

The waste stripping unit (14) may advantageously comprise a removable cassette (22), which can be seen in FIGS. 2 to 7. The removable cassette (22) may have a supporting structure or frame (23). The unit (14) may comprise a bottom front bearing (24) and a bottom rear bearing for the first tool, i.e. the bottom tool (17), and a top front bearing (26) and a top rear bearing for the second tool, i.e. the top tool (18). Both bottom and top bearings (24 and 26), respectively supporting both bottom and top tools (17 and 18) while ensuring their rotation, are inserted at the level of the frame (23).

The removable cassette (22) may be able to be introduced into the frame (16), to be attached to the frame (16) and to be extracted from this frame (16). The cassette (22) enters laterally into a transverse housing formed in the frame (16), between the first (11) and the second (21) transport assemblies. The cassette (22) is installed on a carriage, the operator inserts it into its housing by sliding it transversely and the operator locks it to the frame (16). The movement is reversed when the operator takes the cassette (22) out of the unit (14).

The unit (14) may comprise adjustment means to be able to set a transverse position for the removable cassette (22) in the frame (16). This adjustment is used to set or correct the lateral register with respect to the spiking by the needles (19) of the wastes in the blanks (4).

According to the invention, the waste stripping unit (14) comprises at least one of the two tools, the bottom tool (17) and/or the top tool (18), formed with a mandrel (27) and a removable sleeve (28) on the mandrel. The sleeve (28) is able to be inserted (arrow I in FIGS. 2 and 4) or removed (arrow O in FIG. 4), fixed and driven in rotation by the mandrel (27).

The mandrel (27) is formed with a central body (29), a front journal (31) and a rear journal (32), forming a rotation shaft for the tool (17 and 18). The front and rear journals (31 and 32) are respectively held by front and rear bearings (24 and 26). To ensure the rotation of the bottom tool (17) and of the top tool (18), the rear journal (32), respectively of the bottom tool (17) or of the top tool (18), is joined to a rear gear. This rear gear meshes with a pinion of an electric motor drive (not visible), when the cassette (22) is engaged in the unit (14).

To change the sleeve (28), the operator removes the old sleeve (28), by sliding it (0) over the mandrel (27). Then, by a reverse movement, the operator inserts the new sleeve (28), by sliding it (I) over the mandrel (27).

Particularly advantageously (FIGS. 8 and 9) for the bottom tool (17), the sleeve (28, 28*a* and 28*b*) may have a wall (33*a* and 33*b*) with an outer surface provided with waste stripping needles (19). These stripping needles (19) may be engaged into the wall (33*a* and 33*b*) of this sleeve (28). These needles (19) may protrude radially and emerge outward from the outer surface of the wall (33*a* and 33*b*) of the sleeve (28).

Particularly advantageously (FIGS. 2 and 4) for the top tool (18), the sleeve (28) may have a wall (33) with an outer surface provided with at least one strip, in this case eight strips, made of a flexible material (20). These strips may protrude radially outward from the outer surface of the sleeve (28).

The sleeve (28) may be held firmly on the mandrel (27). For this, and in a first preferred embodiment (see FIG. 8), the tool (17*a*) may comprise a first removable endpiece, situated at the front (34). The front endpiece (34) forms the front journal (31). This front endpiece (34) is coaxial and tapered, thus having a rear inclined face, complementing a front inclined face of the sleeve (28*a*). The front endpiece (34) is screwed onto the body (29*a*) of the mandrel (27).

In the first embodiment, the tool (17*a*) may comprise a second, immobile, opposite endpiece situated at the rear (36). The rear endpiece (36) forms the rear journal (32). This rear endpiece (36) is coaxial and tapered, thus having a front inclined face complementing a rear inclined face of the sleeve (28*a*). The rear endpiece (36) is joined to the body (29*a*) and to the rear journal (32) of the mandrel (27).

The front endpiece (34), forming a counter-cone, may thrust (arrows T) the sleeve (28*a*) against the rear endpiece (36), forming a cone. The thrust (T) of the front endpiece (34) is realized so as to fix this sleeve (28*a*) on the mandrel (27).

In a second embodiment (see FIG. 9), the tool (17*b*) may include a channel (37) supplying pressurized fluid, in this case compressed air. The channel (37) passes through the rear journal (32) and is connected to a pressurized fluid source. The body (29*b*) of the mandrel (27) has a cylinder attached to the front journal (31) and to the rear journal (32). The cylinder of the body (29*b*) is pierced and allows the fluid to pass through.

The pressurized fluid passing through the channel (37) may place the wall (33*b*) of the sleeve (28*b*) under pressure. The wall (33*b*) of the sleeve (28*b*) is slightly expanded, so as to release this sleeve (28*b*) from the body (29*b*). When the pressure is cut, the sleeve (28*b*) is fixed on the body (29*b*).

The tool (17 and 18) with its removable sleeve (28) has to be able to rotate by being held by its bearing. For this, the front bearing (24 and 26), respectively of the bottom tool (17) and of the top tool (18), may preferably be mobile between a position allowing for the extraction of the sleeve (28) and a position allowing for the retention of the sleeve (28), and vice-versa.

The unit (14), and more particularly the cassette (22), may advantageously comprise a bottom arm (38) being able to support the bottom front bearing (24), and a top arm (39) being able to support the top front bearing (26). The two arms, top and bottom, (38 and 39) are in the form of a bracket, similar to a lock. The arms (38 and 39) are provided at the level of the front face (41) of the cassette (22), and are positioned parallel to this front face (41).

The bottom front bearing (24) may be inserted at one of the ends of the bottom arm (38), and the top front bearing (26) may be inserted at a first end of the top arm (39). The two bottom and top arms (38 and 39) comprise an attachment bearing (42) in their central area forming the right angle.

The cassette (22) has a bottom pivot (43) and a top pivot (44) projecting, from the front face (41), toward the front of the cassette (22) and of the unit (14). The bottom arm (38) is mounted on the bottom pivot (43), and the top arm (39) is mounted on the top pivot (44) by their respective attachment bearing (42).

The bottom pivot (43) and the top pivot (44) form a slide and the attachment bearings (42) form a slider. By virtue of this, the two bottom and top arms (38 and 39) can slide transversely from front to rear, and, vice-versa, from rear to front (arrows S in FIGS. 7 and 8). The sliding (S) of the two arms (38 and 39) can allow switching from a position being able to lock the rotation shaft, i.e. the journal (31) of the mandrel (27), of the tool (17 and 18), to a position that can release this rotation shaft, i.e. the journal (31) of the mandrel (27), of this tool (17 and 18), and vice-versa.

The sliding of the bottom arm (38), from rear to front, allows to mechanically disconnect and extract the bottom front bearing (24) from the front journal (31) of the bottom tool (17). The sliding of the bottom arm (38), from front to rear, allows to mechanically connect and insert the bottom front bearing (24) from the front journal (31) of the bottom tool (17).

The sliding (S) of the top arm (39), from rear to front (see FIG. 8), allows to mechanically disconnect and extract the top front bearing (26) from the front journal (31) of the top tool (18). The sliding (S) of the top arm (39), from front to rear (see FIG. 7), allows to mechanically connect and insert the top front bearing (26) of the front journal (31) of the top tool (18).

The bottom pivot (43) and the top pivot (44) also form a tilt axis for the attachment bearings (42). By virtue of this, the two bottom and top arms (38 and 39) can pivot. The rotations are possible only if the slidings (S) of the arm or arms (38 and 39) have taken place beforehand, in order to disconnect the bearing or bearings (24 and 26).

The bottom arm (38) pivots from top to bottom, and vice-versa, from bottom to top. The top arm (39) pivots from bottom to top, and, vice-versa, from top to bottom (arrows R in FIGS. 6 and 7). The rotation (R) of the two arms (38 and 39) can allow switching from a position that can lock the rotation shaft, i.e. the journal (31), of the tool (17 and 18), to a position that can release this rotation shaft, i.e. the journal (31), of this tool (17 and 18), and vice-versa.

The rotation of the bottom arm (38), from top to bottom, can allow freeing the space located in front of the sleeve (28), in order to be able then to extract (O) this same sleeve (28) by sliding it over the mandrel (27) of the bottom tool (17). Conversely, the rotation of the bottom arm (38), from bottom to top, allows to position the bottom front bearing (24) facing the front journal (31) of the bottom tool (17).

The rotation (R) of the top arm (39), from bottom to top (see FIG. 7), allows to free the space located in front of the sleeve (28), in order to be able then to extract (O) this same sleeve (28) by sliding it over the mandrel (27) of the top tool (18). Conversely, the rotation (R) of the top arm (39), from top to bottom (see FIG. 6), allows to position the top front bearing (26) facing the front journal of the top tool (18).

For the waste stripping cassette according to a second alternative embodiment (see FIG. 3), the rotation of the bottom arm (38), from top to bottom, allows to free the space located in front of the sleeve, in order to be able to then extract this same sleeve by sliding it over the mandrel of the bottom tool (17). Conversely, the rotation of this bottom arm (38), from bottom to top, allows to position the bottom front bearing (24) facing the front journal (31) of the bottom tool (17).

In this second alternative embodiment, the rotation (R) of the top arm (39), from top to bottom, allows to free the space located in front of the sleeve (28), in order to be able to then extract this same sleeve (28) by sliding it over the mandrel (27) of the top tool (18). Conversely, the rotation (R) of the top arm (39), from bottom to top, allows to position the top front bearing (26) facing the front journal of the top tool (18).

Preferably, the unit (14), and thus the cassette (22), may comprise means (46) for displacing the top tool (18) relative to the bottom tool (17). The displacement means (46) act on a lever (47). The lever (47) is joined to and pivots with the top pivot (44). The displacement means (46) are, for example, of the pneumatic cylinder type mechanically connected to the lever (47). The displacement means (46) and the lever (47) are provided on the front face (41) and on the rear face of the cassette (22).

The displacement means (46) pull the lever (47), so as to bring the top tool (18) toward the bottom tool (17). The displacement means (46) are used to lever the top tool (18), to be able to extract the sleeve (28, 28*a* and 28*b*). These displacement means (46) also serve as a release valve in case of a cardboard jam.

Advantageously, the unit (14), and thus the cassette (22), may comprise adjustment means (48), to be able to adjust a gap that exists between the top tool (18) and the bottom tool (17). The adjustment means (48) acts on the lever (47). The adjustment means (48) for example take the form of a cam forming an abutment in contact with the lever (47).

The displacement means (46) push the lever (47), so as to space away the top tool (18) from the bottom tool (17). The adjustment means (48) is used to be able to set the gap that exists between this bottom tool (17) and this top tool (18), for the passage of the blanks (4). The adjustment means (48) is set so that the strip or strips (20) of the sleeve (28) of the top tool (18) touch the blanks (4) passing between the bottom and top tools (17 and 18).

Once the bearings (24 and 26) have been engaged in the respective front journals (31), the arms (38 and 39) are fixed. The fixation of the bottom arm (38) is obtained by virtue of the pressing of a second of the ends of the bottom arm (38) against a fixed abutment (49) of the front face (41) of the cassette (22). The fixation of the top arm (39) is obtained by virtue of the pressing and anchoring of a second of the ends of the top arm (39) against an abutment (51) present on the lever (47).

The present invention is not limited to the embodiments described and illustrated. Numerous modifications can be made, without in any way departing from the framework defined by the scope of the set of claims.

The invention claimed is:

1. A waste stripping unit for a packaging production machine, the waste stripping unit positioned downstream along a path of substrates after a cutting unit for cutting the substrates, the waste stripping unit comprising:

a frame;

two rotary tools supported by the frame for cooperating with one another, at least one of the two tools including a mandrel and a removable sleeve, the removable sleeve being removably inserted on the mandrel and fixed on the mandrel, and the removable sleeve is driven in rotation by rotation of the mandrel;

a front bearing for at least one of the two tools, the front bearing being movable between a first position that allows extracting the sleeve from the mandrel and a second position that retains the sleeve on the mandrel; and a rotation shaft for the at least one of the two tools;

an arm comprising one end supporting the front bearing at the one end of the arm, the arm sliding transversely to the path of the substrates and pivoting between a locking position locking the rotation shaft of the tool and a releasing position releasing the rotation shaft of the tool enabling extraction of the sleeve from the mandrel, and vice-versa.

2. The waste stripping unit as claimed in claim 1, wherein the sleeve has a peripheral wall with an outer surface of the wall, waste stripping needles engaged in the wall and the needles protruding radially outward from the outer surface of the wall.

3. The waste stripping unit of claim 2, further comprising a respective sleeve on each of the tools, the sleeve on one of the tools having the needles;

the sleeve on the other of the tools having a respective second peripheral wall with an outer surface of the second wall, at least one strip comprised of a flexible material and protruding radially from the outer surface of the second wall.

4. The waste stripping unit of claim 3, wherein the needles are at first axial locations along the respective sleeve and the strips at a second axial locations along their respective sleeve such that the first and second axial locations do not overlap such that the needles do not engage the strips.

5. The waste stripping unit as claimed in claim 1, wherein the sleeve has a peripheral wall with an outer surface of the wall, at least one strip comprised of a flexible material, the strip protruding radially outward from the outer surface of the wall.

6. The waste stripping unit as claimed in claim 1, wherein one of the tools comprises a pressurized fluid supply channel, communicating inside the wall for placing the wall of the sleeve under pressure from inside the sleeve for releasing the sleeve from the mandrel.

7. The waste stripping unit as claimed in claim 1, wherein at least one of the tools comprises a first coaxial endpiece removably positioned on the at least one tool, the first endpiece positioned and operative for pushing the sleeve against a second opposite endpiece positioned on the tool for fixing the sleeve on the mandrel.

8. The waste stripping unit as claimed in claim 1, further comprising an adjustment device for setting a gap between a bottom one of the tools and a top one of the tools.

9. The waste stripping unit as claimed in claim 8, further comprising a displacement device for displacing one of the tools relative to the other of the tools.

10. The waste stripping unit as claimed in claim 1, further comprising a first transport assembly for transporting a flat substrate, the first transport assembly being placed upstream of the two rotary tools along the path of the substrates, and a second transport assembly for transporting the flat substrate, the second transport assembly being placed downstream of the two rotary tools, and the first and the second transport assemblies being mounted in the frame of the stripping unit.

11. The waste stripping unit as claimed in claim 1, further comprising:

a removable cassette, the cassette comprising a cassette frame including respective ones of the bearings supporting the two rotary tools, and the cassette is configured to be introduced into, attached to and extracted from the frame of the stripping unit.

12. The waste stripping unit as claimed in claim 11, further comprising a setting device for adjusting a transverse position of the cassette in the frame of the stripping unit.

13. A packaging production machine, comprising the waste stripping unit as claimed in claim 1, and positioned downstream in the path of substrates from a cutting unit.

14. The packaging production machine as claimed in claim 13, comprising, in order from upstream to downstream in the path of substrates, a diecutting platen press, for cutting substrates a driving arrangement for driving cut substrates, a transfer device for cut substrates, a first vacuum transport for cut substrates, the waste stripping unit for stripping waste from the substrates, and a second vacuum transport for cut substrates.

* * * * *